United States Patent
Yamaji

(10) Patent No.: US 11,036,378 B2
(45) Date of Patent: Jun. 15, 2021

(54) IMAGE PROCESSING APPARATUS, IMAGE PROCESSING METHOD, IMAGE PROCESSING PROGRAM, AND RECORDING MEDIUM STORING PROGRAM

(71) Applicant: FUJIFILM Corporation, Tokyo (JP)

(72) Inventor: Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/433,067

(22) Filed: Jun. 6, 2019

(65) Prior Publication Data
US 2019/0377484 A1    Dec. 12, 2019

(30) Foreign Application Priority Data
Jun. 8, 2018    (JP) .............................. JP2018-110160

(51) Int. Cl.
| | |
|---|---|
| G06F 3/048 | (2013.01) |
| G06F 3/0484 | (2013.01) |
| G06Q 30/02 | (2012.01) |
| G06T 11/60 | (2006.01) |
| G06F 3/0482 | (2013.01) |

(52) U.S. Cl.
CPC ........ *G06F 3/04847* (2013.01); *G06F 3/0482* (2013.01); *G06Q 30/0282* (2013.01); *G06T 11/60* (2013.01)

(58) Field of Classification Search
CPC ............. G06F 3/04847; G06F 3/0482; G06Q 30/0282; G06T 11/60
USPC ....................................................... 715/765
See application file for complete search history.

(56) References Cited

U.S. PATENT DOCUMENTS

| | | | |
|---|---|---|---|
| 9,171,016 B2* | 10/2015 | Inoue .................... | H04N 21/458 |
| 10,237,602 B2* | 3/2019 | Lin ..................... | H04N 21/8549 |
| 10,339,587 B2* | 7/2019 | Nakashima ........ | G06Q 30/0631 |
| 10,359,891 B2* | 7/2019 | Chung ................ | G06F 3/04883 |
| 10,534,806 B2* | 1/2020 | Stoddard, II ............ | G06F 16/44 |
| 2006/0050993 A1* | 3/2006 | Stentiford ............... | G06F 16/58 |
| | | | 382/305 |
| 2013/0117692 A1* | 5/2013 | Padmanabhan .... | H04N 21/4126 |
| | | | 715/753 |

(Continued)

FOREIGN PATENT DOCUMENTS

| | | | |
|---|---|---|---|
| JP | H09-305784 A | 11/1997 | |
| JP | 2000-029961 A | 1/2000 | |

(Continued)

*Primary Examiner* — David Phantana-angkool
(74) *Attorney, Agent, or Firm* — Studebaker & Brackett PC

(57) ABSTRACT

Provided are an image processing apparatus, an image processing method, an image processing program, and a recording medium thereof, capable of performing output in accordance with an output format depending on a user's preference.
A plurality of images are read, and a question relating to a user's preference is notified during analysis of the images. A user answers the question. On the basis of an image analysis result and a received answer to the question, an output format of an album in which images are laid out is determined. The album of the determined output format is preview-displayed, and the user performs change as necessary. In accordance with an order command from the user, the laid-out album is created.

18 Claims, 10 Drawing Sheets

(56) References Cited

U.S. PATENT DOCUMENTS

| | | | | |
|---|---|---|---|---|
| 2014/0281965 A1* | 9/2014 | Yamaji | ............... | G06F 16/50 |
| | | | | 715/708 |
| 2014/0304019 A1* | 10/2014 | Scott | ............ | G06Q 10/063114 |
| | | | | 705/7.15 |
| 2015/0134371 A1* | 5/2015 | Shivakumar | ........... | G06Q 50/01 |
| | | | | 705/5 |
| 2016/0078322 A1* | 3/2016 | Yamaji | ................ | G06T 7/97 |
| | | | | 382/224 |
| 2016/0104509 A1* | 4/2016 | Loscalzo | ............. | G11B 27/034 |
| | | | | 386/290 |
| 2016/0189407 A1* | 6/2016 | Hodgson | ................ | G06T 11/60 |
| | | | | 715/204 |
| 2017/0039747 A1* | 2/2017 | Ishida | .................... | G06T 1/0007 |
| 2018/0082455 A1* | 3/2018 | Yamaji | ............... | G06K 9/00664 |
| 2018/0196587 A1* | 7/2018 | Bialynicka-Birula | ...................... | |
| | | | | G06T 3/0093 |
| 2018/0217743 A1* | 8/2018 | Ishida | ................ | G06F 3/04847 |
| 2018/0300784 A1* | 10/2018 | Koizumi | ................ | G06F 13/00 |
| 2018/0341652 A1* | 11/2018 | Yamaji | ................... | G06Q 10/10 |
| 2019/0130627 A1* | 5/2019 | Koizumi | ............... | G06T 7/0002 |
| 2019/0325627 A1* | 10/2019 | Kunieda | ................. | G06T 11/60 |
| 2019/0377484 A1* | 12/2019 | Yamaji | ............... | G06F 3/04847 |
| 2020/0026397 A1* | 1/2020 | Wohlstadter | ........ | G06F 3/04845 |
| 2020/0184278 A1* | 6/2020 | Zadeh | .................. | G06F 16/953 |
| 2020/0410278 A1* | 12/2020 | Nelson | ............... | G06K 9/00671 |

FOREIGN PATENT DOCUMENTS

| | | |
|---|---|---|
| JP | 2014-199641 A | 10/2014 |
| JP | 2016-062122 A | 4/2016 |

\* cited by examiner

FIG. 6

IMAGE IS BEING ANALYZED.

PLEASE, ANSWER THE NEXT QUESTION. 61

QUESTION 2: WHAT ARE YOU DOING OVER THE WEEKEND?

- 62 ☑ SPORTS
- 63 ☐ READING
- 64 ☐ INTERNET
- 65 ☑ DRIVING
- 66 ☐ EATING AND WALKING
- 67 ☐ MOVIES (RETURN TO BEGINNING) 47   (RETURN) 48   (NEXT) 49

FIG. 7

IMAGE IS BEING ANALYZED.

PLEASE, ANSWER THE NEXT QUESTION. 71

QUESTION 3: WHICH IMAGE DO YOU LIKE?

72A/72, 73A/73, 74A/74, 75A/75
76A/76, 77A/77, 78A/78, 79A/79

(RETURN TO BEGINNING) 47   (RETURN) 48   (NEXT) 49

IMAGE PROCESSING APPARATUS, IMAGE PROCESSING METHOD, IMAGE PROCESSING PROGRAM, AND RECORDING MEDIUM STORING PROGRAM

CROSS-REFERENCE TO RELATED APPLICATIONS

The present application claims priority under 35 U.S.C. § 119 to Japanese Patent Application No. 2018-110160, filed Jun. 8, 2018. Each of the above application(s) is hereby expressly incorporated by reference, in its entirety, into the present application.

BACKGROUND OF THE INVENTION

1. Field of the Invention

The present invention relates to an image processing apparatus, an image processing method, an image processing program, and a recording medium storing program.

2. Description of the Related Art

Creating an album that matches a user's preference using multiple images, such as a photo book, has been performed. In creating the album depending on the user's preference, it is necessary to understand the user's preference. A technique for determining a photo's position using a mouse by a user (JP1997-305784A (JP-H09-305784A)), a technique for inferring a user's preference on the basis of an image analysis result (JP2014-199641A), a technique for analyzing a user's preference on the basis of an image group theme (JP2016-062122A), or the like, has been proposed. Further, a method for asking a user a question to display product information has been proposed, for example (JP2000-029961A).

SUMMARY OF THE INVENTION

Making a user take a new trouble in order to understand a user's preference gives a cumbersome impression to the user. In the technique disclosed in JP1997-305784A (JP-H09-305784A), a user merely determines arrangement of photos. In the technique disclosed in JP2014-199641A, since the user's preference is inferred only on the basis of the image analysis result, it is not sure to determine whether the user's preference can be correctly inferred in creation of an album or the like. Thus, it is not possible to recognize whether the inferred user's preference is correct. In the technique disclosed in JP2016-062122A, since the user's preference is analyzed on the basis of the image group theme, it is not sure to determine whether the user's preference can be analyzed in creation of an album or the like. In the technique disclosed in JP2000-029961A, even though a user can easily select a product that matches a user's demand, it is difficult to understand the user's preference.

An object of the invention is to provide a technique capable of reflecting a user's preference in an image output format, without giving a cumbersome impression to a user.

According to an aspect of the invention, there is provided an image processing apparatus comprising: an image analysis device (image analysis means) that analyzes a plurality of images; a question notification device (question notification means) that notifies a question about a user's preference during the image analysis in the image analysis device; an answer reception device (answer reception means) that receives an answer to the question notified by the question notification device; and an output format determination device (output format determination means) that determines an output format on the basis of an image analysis result in the image analysis device and the answer received in the answer reception device (determination of an image to be output from the plurality of images is also included in the determination of the output format).

According to another aspect of the invention, there is provided an image processing method suitable for an image processing apparatus. The image processing method comprises: analyzing a plurality of images, using an image analysis device; notifying a question about a user's preference during the image analysis in the image analysis device, using a question notification device; receiving an answer to the question notified by the question notification device, using an answer reception device; and determining an output format on the basis of an image analysis result in the image analysis device and the answer received in the answer reception device, using an output format determination device.

The image processing apparatus according to the aspect of the invention may include a processor, and the processor may perform the analysis of the plurality of images, the notification of the question about the user's preference during the image analysis, the reception of the answer to the notified question, and the determination of the output format on the basis of the image analysis result and the received answer.

According to still another aspect of the invention, there are provided non-transitory recording medium storing a computer-readable program for controlling a computer of the image processing apparatus, and there may be provided the program.

The image processing apparatus may further comprise an output control device (output control means) that controls an output device so that at least a part of the plurality of images is output in accordance with the output format determined in the output format determination device.

The question notification device may notify a question about the user's preference of the output format, and may notify a question about the user's preference excluding the output format, for example.

The question notification device may notify the question by displaying a plurality of sample images of the plurality of images, and the answer reception device may receive sample image selection from the plurality of displayed sample images.

The plurality of sample images are determined on the basis of the result of the image analysis already performed in the image analysis device, for example.

The image processing apparatus may further comprise a first image selection device (first image selection means) that selects an image from the plurality of images on the basis of the sample images received in the answer reception device.

The question notification device may notify the question by displaying the plurality of images, and the answer reception device may receive image selection from the plurality of displayed images.

The image processing apparatus may further comprise a second image selection device (second image selection means) that selects an image from the plurality of images on the basis of the image selection received in the answer reception device.

In a case where an expected time necessary from a time when the question is notified in the question notification device to a time when the answer is received in the answer reception device is set in advance for each question, the question notification device determines the question to be notified on the basis of a time necessary for the image analysis in the image analysis device and the expected time, for example.

The image analysis device creates one image using a part of the plurality of images, for example, the question notification device notifies the user of the one image in a state where the one image is editable as the question, for example, the answer reception device receives editing of the one image as the answer, for example, and the output format determination device determines the output format on the basis of the image analysis result in the image analysis device and the editing received in the answer reception device, for example.

The one image is one page of an album configured of a plurality of pages, for example, the question notification device notifies the user of the one page in a state where the one page is editable as the question, for example, and the answer reception device receives editing of the one page as the answer, for example.

The one image is one piece of image merchandise among a plurality of pieces of image merchandise, for example, the question notification device notifies the user of the one piece of image merchandise in a state where the one piece of image merchandise is editable as the question, for example, and the answer reception device receives editing of the one piece of image merchandise as the answer, for example.

The output control device controls the output device so that at least the part of the plurality of images is output in accordance with the output format determined on the basis of the image analysis result in the image analysis device, the answer received in the answer reception device, and information on user's previous image editing, for example.

The image processing apparatus may further comprise: a user satisfaction level input device (user satisfaction level input means) that inputs a user satisfaction level for an image output from the output device under the control of the output control device; and a user satisfaction level transmission device (user satisfaction level transmission means) that transmits data indicating the user satisfaction level input in the user satisfaction level input device to a server.

According to the invention, since a question about a user's preference is notified during image analysis, it is possible to determine an output format on the basis of the user's preference, without giving a new cumbersome impression to a user.

BRIEF DESCRIPTION OF THE DRAWINGS

FIG. 6 is a diagram showing an example of a second question window.

FIG. 7 is a diagram showing an example of a third question window.

DESCRIPTION OF THE PREFERRED EMBODIMENTS

First Embodiment

Figure 1:
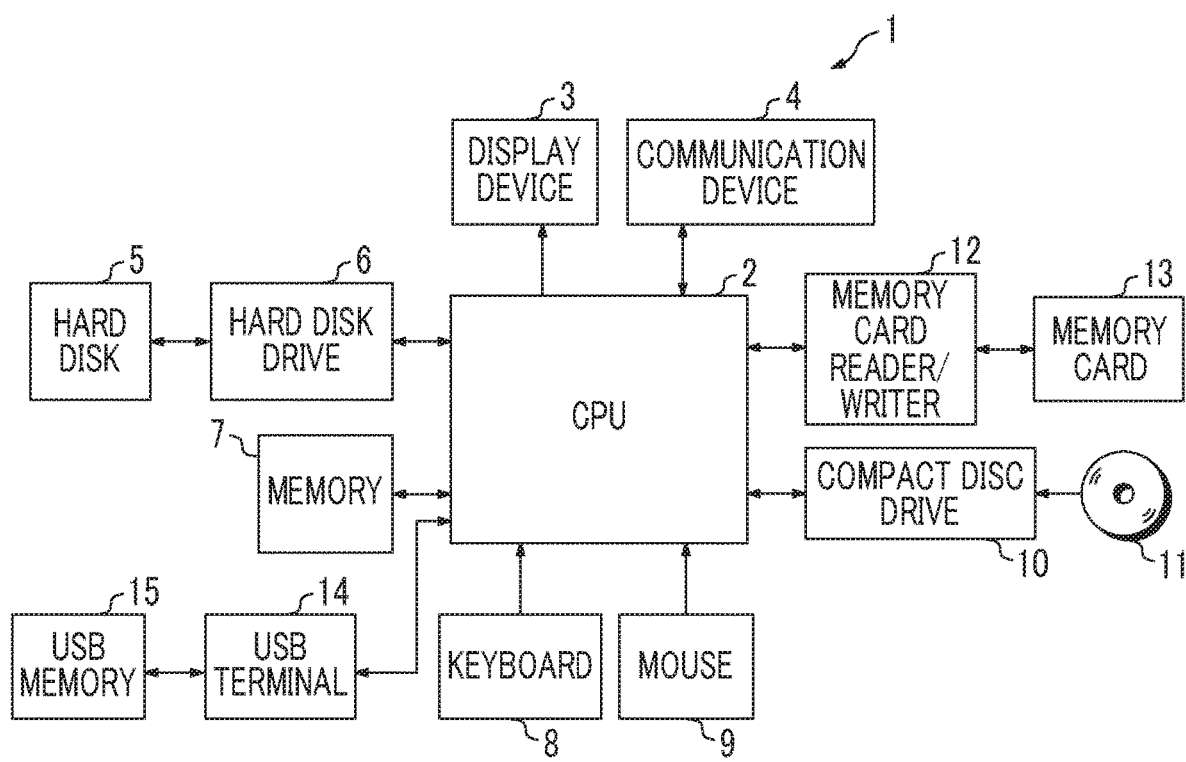
FIG. 1 is a block diagram showing an electric configuration of an image processing apparatus.

FIG. 1 shows an embodiment of the invention, which is a block diagram showing an electric configuration of an image processing apparatus 1.

An overall operation of the image processing apparatus 1 is generally controlled by a central processing unit (CPU) 2.

The image processing apparatus 1 includes a display device 3 that displays images and other information on a display screen, and a communication device 4 that is connected to a network such as the Internet and communicates with an apparatus other than the image processing apparatus 1. Further, the image processing apparatus 1 also includes a hard disk 5, a hard disk drive 6 that accesses the hard disk 5, a memory 7 that stores data or the like, a keyboard 8 and a mouse 9 through which a command or the like is input. In addition, the image processing apparatus 1 also includes a compact disc drive 10 that accesses a compact disc 11, and a memory card reader/writer 12 that performs writing of data to a memory card 13 and reading of data recorded on the memory card 13. The image processing apparatus 1 is formed with a USB terminal 14 that accesses a universal serial bus (USB) memory 15.

An operation program of the image processing apparatus 1 (which will be described later) is received in the communication device 4 through the Internet. The received operation program is installed in the image processing apparatus 1. The operation program may be recorded on a portable recording medium such as the compact disc 11, and may be read from the portable recording medium, instead of being installed in the image processing apparatus 1 after being received in the image processing apparatus 1 through the network such as the Internet. In this case, the operation program read from the portable recording medium is installed in the image processing apparatus 1. The operation program may be read by the computer (CPU 2) of the image processing apparatus 1.

Figure 2:
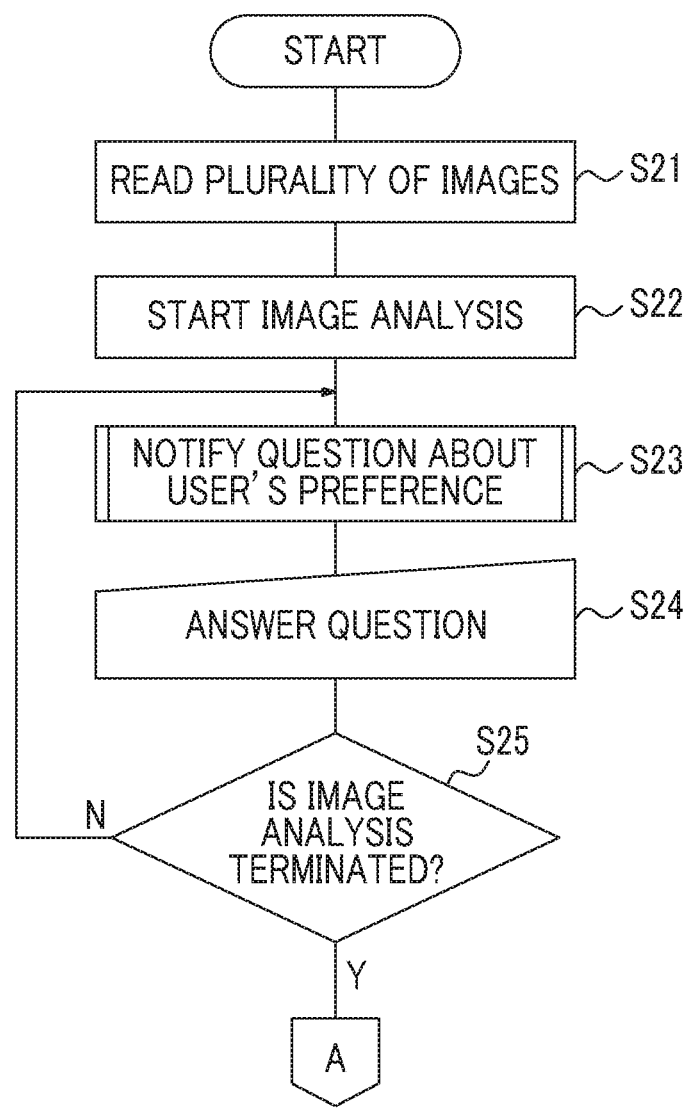
FIG. 2 is a flowchart showing a processing procedure of the image processing apparatus.
Figure 3:
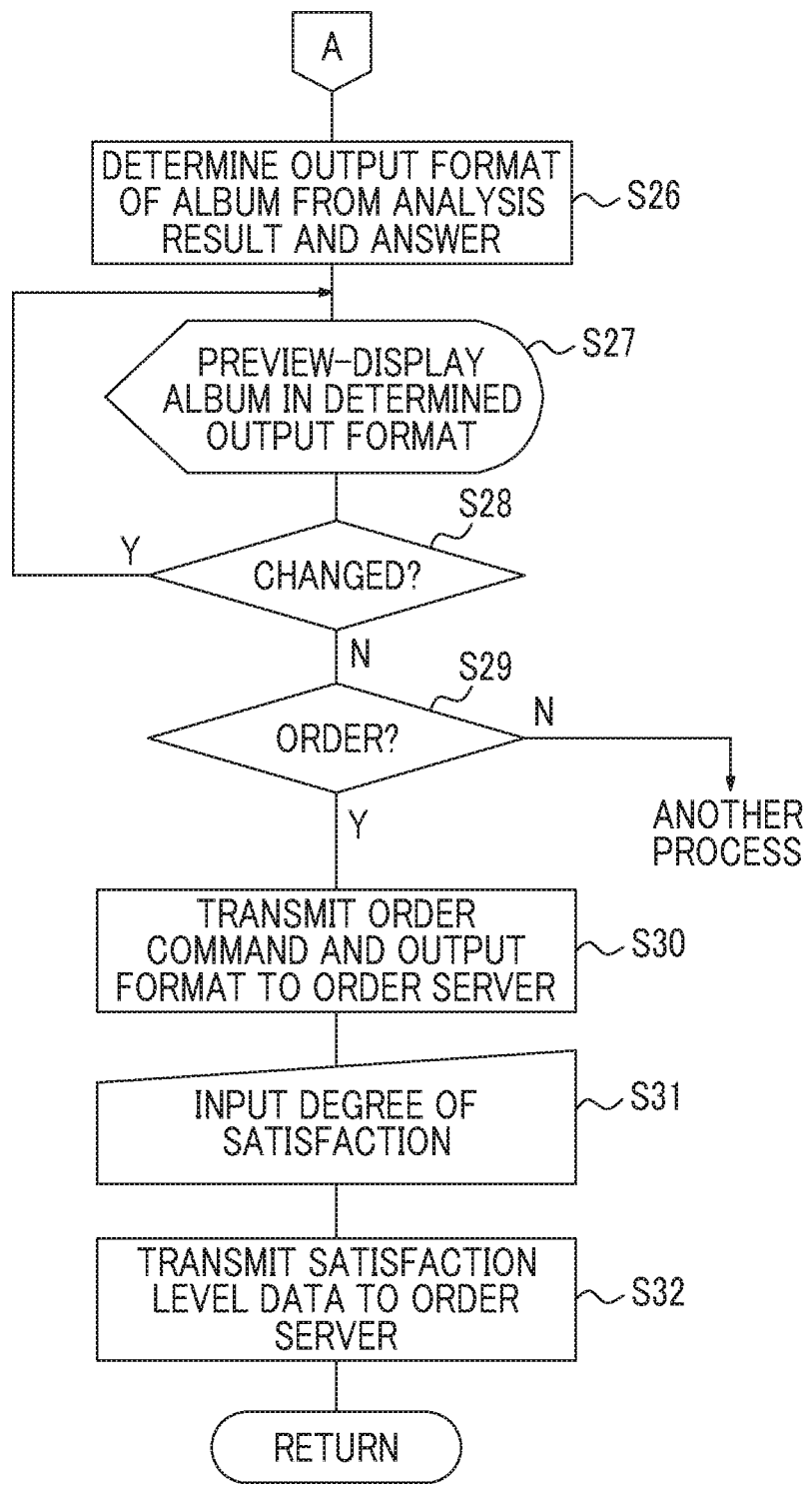
FIG. 3 is a flowchart showing a processing procedure of the image processing apparatus.
Figure 4:
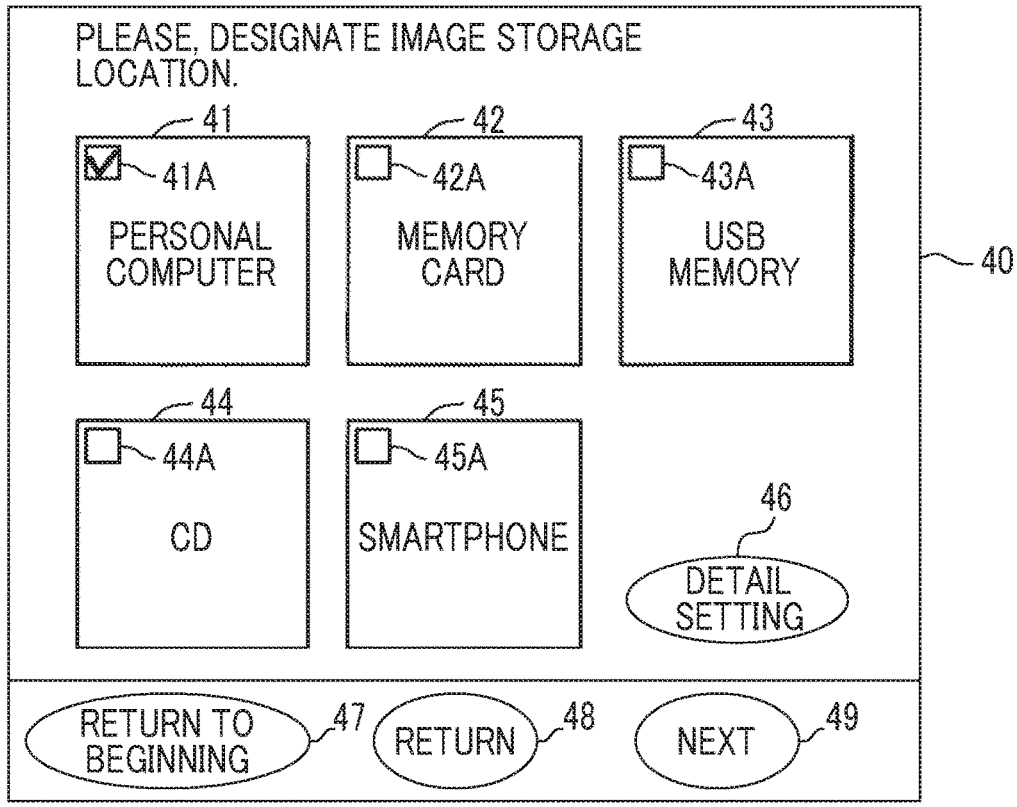
FIG. 4 is a diagram showing an example of a storage location designation window.

FIGS. 2 and 3 are flowcharts showing a processing procedure of the image processing apparatus 1. FIG. 4 is a diagram showing an example of a storage location designation window 40 displayed on the display screen of the display device 3.

In this embodiment, a plurality of images are selected from multiple images, and an album is created using the selected images.

In a case where the operation program of the image processing apparatus 1 is started by a user, a window for designating a theme of the creation of the album, an imaging period of time of images to be used in the album, and the like is displayed on the display screen of the display device 3, and then, the storage location designation window 40 shown in FIG. 4 is displayed.

Referring to FIG. 4, a first area 41 to a fifth area 45 for designating locations where images to be used in the album are stored are formed in the storage location designation window 40. Check boxes 41A to 45A capable of being checked by the user are formed on respective left upper portions of the first area 41 to the fifth area 45.

A character string of "personal computer" is displayed in the first area 41. In a case where the album is created using images displayed by an image file stored in the hard disk 5 of the image processing apparatus 1, the check box 41A formed in the first area 41 is checked by the user. A character string of "memory card" is displayed in the second area 42. In a case where the album is created using images displayed by an image file stored in the memory card 13, the check box 42A formed in the second area 42 is checked by the user. A character string of "USB memory" is displayed in the third area 43. In a case where the album is created using images displayed by an image file stored in the USB memory 15, the check box 43A formed in the third area 43 is checked by the user. A character string of "CD" is displayed in the fourth area 44. In a case where the album is created using images displayed by an image file stored in the CD 11, the check box 44A formed in the fourth area 44 is checked by the user. A character string of "smartphone" is displayed in the fifth area 45. In a case where a smartphone is connected to the image processing apparatus 1 and the album is created using images displayed by an image file stored in the smartphone (not shown), the check box 45A formed in the fifth area 45 is checked by the user.

A detail setting button 46 in which a character string of "detail setting" is displayed is formed at a lower right portion of the storage location designation window 40. In a case where the detail setting button 46 is pressed, a window for designating a folder appears on the display screen of the display device 3, and a folder in which image files to be used in the album are stored may be designated by the user.

At a lower portion of the storage location designation window 40, a return-to-beginning button 47 in which a character string of "return-to-beginning" is displayed, a return button 48 in which a character string of "return" is displayed, and a next button 49 in which a character string of "next" is displayed are formed. In a case where the return-to-beginning button 47 is pressed, a window that is first displayed on the display screen of the display device 3, on which the operation program of the image processing apparatus 1 is started, is displayed on the display screen of the display device 3. In a case where the return button 48 is pressed, a window displayed before the window currently displayed on the display screen of the display device 3 is displayed. In a case where the next button 49 is pressed, a window to be displayed after the window currently displayed on the display screen of the display device 3 is displayed.

Figure 5:
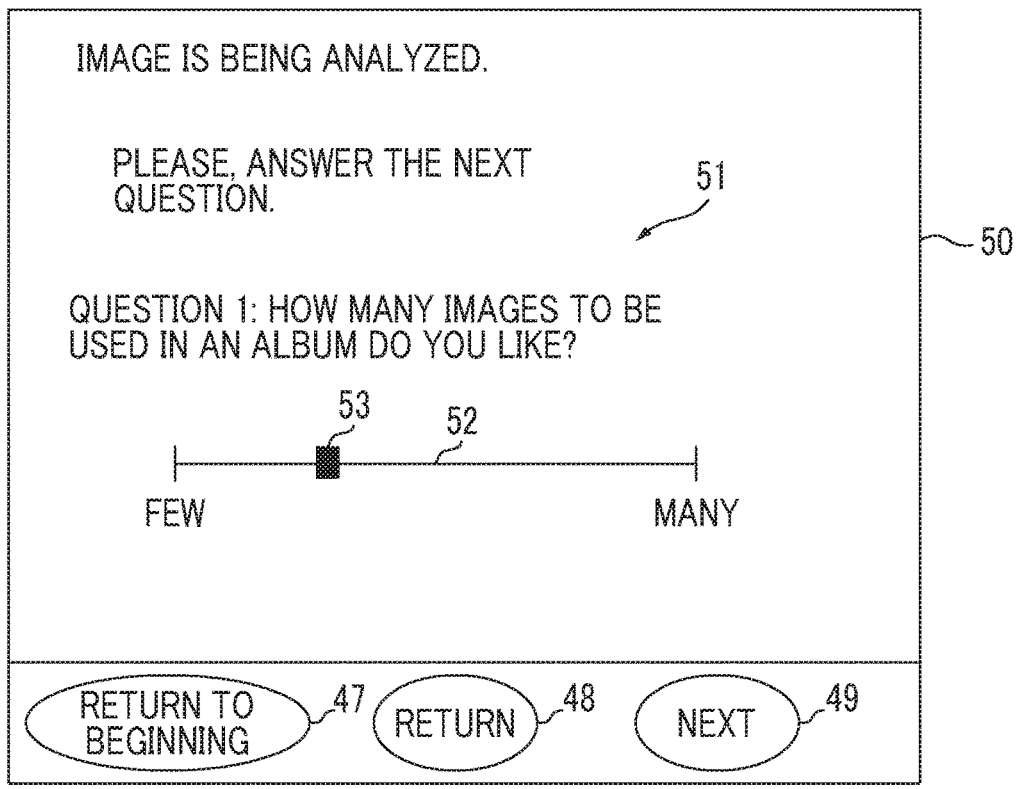
FIG. 5 is a diagram showing an example of a first question window.

In a case where a certain check box among the check boxes 41A to 45A is checked, or in a case where the detail setting button 46 is pressed to designate a desired folder, a plurality of image files stored in a storage location corresponding to the checked check box or the designated folder are read (step S21 in FIG. 2). Then, image analysis of the plurality of read image files (images) is started by the CPU 2 (image analysis device) (step S22 in FIG. 2). The image analysis is a process of analyzing whether the image files (images) are suitable for images to be used in a target for which the images are used, such as an album, and includes, for example, a process of analyzing the degree of out-of-focus, a position of a main subject, a relative size of the main subject with respect to the entirety of an image, a tone, and a resolution. In a case where the storage location designation window 40 shown in FIG. 4 is displayed, and in a case where the next button 47 is pressed and the image analysis is then started, a first question window 50 shown in FIG. 5 is displayed on the display screen of the display device 3 (question notification device), and a question for a user's preference is notified (step S23 in FIG. 2). The question for the user's preference may be notified during the image analysis, and as long as a period during the image analysis and a period during which the question is notified at least overlap with each other, any time may be used. The user's preference represents a preference, a personality, or the like of a user. The question may be a question for urging an expression of user's intentions, and does not include only a question as a sentence, but may also include image selection, color selection, shape selection, or the like. Further, it is not essential that the question according to this embodiment of the invention is displayed as a "question" on a display.

Further, the question also includes a game display. The user's preference may be inferred from user's operation content in the game. With respect to a user who takes long time for operation, a calm atmosphere may be inferred as a user's preference, and with respect to a user who takes short time for operation, a dynamic atmosphere may be inferred as a user's preference.

On the first question window 50 shown in FIG. 5, a first question 51 is displayed under a character string of "Image is being analyzed. Please, answer the next question."

The first question 51 is a question of "How many images to be used in an album do you like?" Under the first question 51, a slide bar 52 in which a slider 53 slides in a lateral direction is formed. The degree of the number of images that a user prefers can be understood on the basis of the position of the slider 53. As the slider 53 is positioned on a left side, it shows that the user prefers a small number of images, and as the slider 53 is positioned on a right side, it shows that the user prefers a large number of images. The positioning of the slider 53 using the slide bar 52 (answer reception device) becomes an answer to the question (step S24 in FIG. 2).

The first question 51 is a question relating to a user's preference for an output format of an album. In this way, a direct question for the output format of the album may be given to the user. The direct question refers to a question for which the output format of the album is unambiguously determined from an answer. The output format refers to a pattern in which a plurality of images are changed on the basis of a question to a user, which includes images selected from the plurality of images, a layout of the images, a mount on which the images are pasted.

In a case where the image analysis is not terminated (NO in step S25 in FIG. 2) and the next button 49 of the first question window 50 shown in FIG. 5 is pressed, a second question window 60 shown in FIG. 6 is displayed on the display screen of the display device 3.

On the second question window 60, similarly, a second question 61 is displayed under a character string of "Image is being analyzed. Please, answer the next question."

The second question 61 is a question of "What are you doing over the weekend?" As a character string for selecting activity content of the user, "sports", "reading", "Internet", "drive", "eating and walking", and "movie" are displayed under the second question 61. On left sides of the respective character strings of "sports", "reading", "Internet", "drive", "eating and walking", and "movie", check boxes 62, 63, 64, 65, 66, and 67 are formed. A user answers the question by checking one or more check boxes among the check boxes 62, 63, 64, 65, 66, and 67 (answer reception device).

A personality or the like of the user can be understood from content checked by the user, and an output format of the content based on the personality is determined. In a case where it is determined that the user's personality is quiet, an album is created using a quiet patterned template, or is created with a layout that a lot of users like. In a case where it is determined that the user's personality is wild, an album is created using a fancy patterned template, or is created with an impactful layout. Further, layouts, templates, or the like based on personalities of users may be determined in advance.

The second question 61 is a question relating to a user's preference excluding an output format of an album. In this way, an indirect question for the output format of the album may be given to the user. The indirect question refers to a question for which an output format of an album cannot be unambiguously determined from an answer.

In a case where the image analysis is not terminated (NO in step S25 in FIG. 2) and the next button 49 of the second question window 60 shown in FIG. 6 is pressed, a third question window 70 shown in FIG. 7 is displayed on the display screen of the display device 3.

On the third question window 70, similarly, a third question 71 is displayed under a character string of "Image is being analyzed. Please, answer the next question."

The third question 71 is a question of "Which image do you like?" Sample images (in which the sample images are images that are prepared in advance, irrespective of images given from a user) 72 to 79 are displayed under the third question 71. Check boxes 72A, 73A, 74A, 75A, 76A, 77A, 78A, and 79A are respectively formed on left sides of a white cat sample image 72, a black cat sample image 73, a white dog sample image 74, a bulldog sample image 75, a rose sample image 76, a carnation sample image 77, a sleepy baby sample image 78, and a crying baby sample image 79. A user answers the question by checking one or more check boxes among the check boxes 72A, 73A, 74A, 75A, 76A, 77A, 78A, and 79A (answer reception device) using the mouse 9 to select sample images.

On the third question window 70 shown in FIG. 7, similarly, a personality or the like of a user can be understood from content checked by the user, and an output format of the content based on the personality is determined. For example, it may be considered that a user who selects the sleepy baby sample image 78 is gentle, and an album may be created using a gentle color template. Further, it may be considered that a user who selects the rose sample image 76 likes a beautiful stuff, and an album is created using a beautiful colored template. With respect to other sample images, similarly, a personality or the like of a user may be determined from a selected sample image, and an output format of an album may be determined on the basis of the determined personality or the like of the user. For example, images to be used in an album may be selected from the plurality of images by the CPU 2 (first image selection device and second image selection device). Since the sample images are used, it is possible to quickly ask a user a question.

Further, it is preferable that sample images to be displayed are determined on the basis of a result of the already performed image analysis. It is possible to display sample images capable of more effectively understanding a user's preference. For example, in a case where it is not possible to understand the user's preference relating to whether a user prefers a cute album or a beautiful album from the already performed image analysis, sample images from which a user's preferred album can be understood are displayed.

Figure 8:
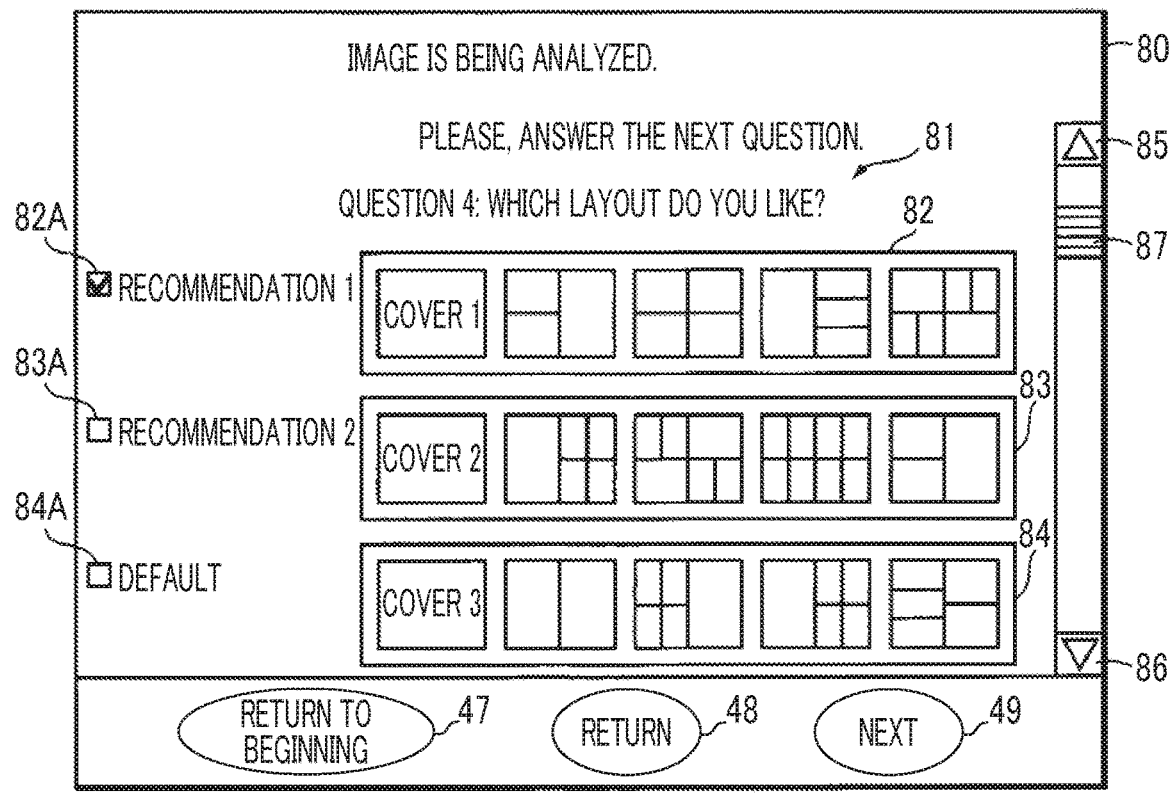
FIG. 8 is a diagram showing an example of a fourth question window.

In a case where the image analysis is not terminated (NO in step S25 in FIG. 2) and the next button 49 of the third question window 70 shown in FIG. 7 is pressed, a fourth question window 80 shown in FIG. 8 is displayed on the display screen of the display device 3.

On the fourth question window 80, similarly, a fourth question 81 is displayed under a character string of "Image is being analyzed. Please, answer the next question."

The fourth question 81 is a question of "Which layout do you like?" A first sample layout window 82, a second sample layout window 83, and a third sample layout window 84 for displaying sample layouts (examples of sample images) are displayed under the fourth question 81. A first check box 82A, a second check box 83A, and a third check box 84A are formed on left sides of the first sample layout window 82, the second sample layout window 83, and the third sample layout window 84. Character strings of "recommendation 1", "recommendation 2", and "default" are respectively displayed on right sides of the first check box 82A, the second check box 83A, and the third check box 84A.

On the first sample layout window 82, a sample layout considered to be most suitable for a user's preference is displayed on the basis of already analyzed images until the fourth question window 80 is displayed, user's answers to the first question 51, the second question 61, and the third question 71. On the second sample layout window 83, a sample layout considered to be suitable for the user's preference next to the sample layout displayed on the first sample layout window 82 is displayed. On the third sample layout window 84, a predetermined sample layout is displayed.

An up button 85, a down button 86, and a knob 87 are formed on a right edge of the fourth question window 80. As the up button 85, the down button 86, or the knob 87 is operated, a scroll command is given, so that a sample window that is not displayed on the fourth question window 80 is displayed on the fourth question window 80.

The user designates a sample layout suitable for the user's preference by checking a certain check box from the first check box 82A, the second check box 83A, the third check box 84A, and the like (answer reception device) displayed on the fourth question window 80. An output format of the album is determined on the basis of the designated sample layout.

Figure 9:
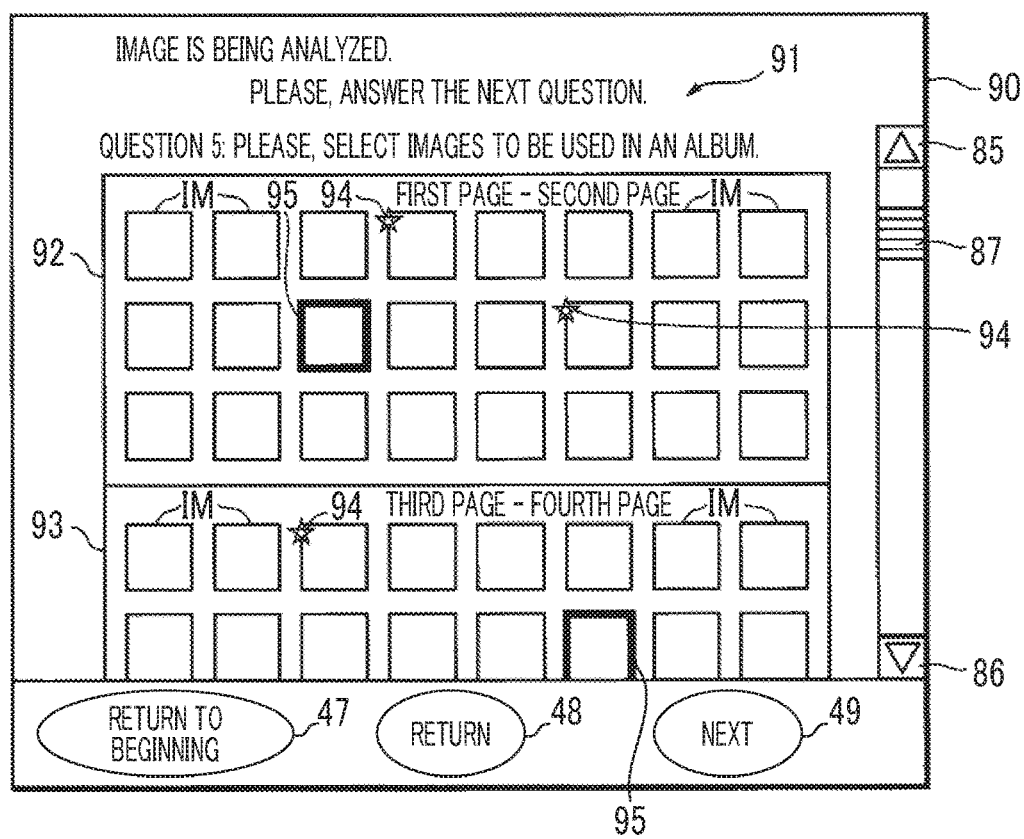
FIG. 9 is a diagram showing an example of a fifth question window.

In a case where the image analysis is not terminated (NO in step S25 in FIG. 2) and the next button 49 of the fourth question window 80 shown in FIG. 8 is pressed, a fifth question window 90 shown in FIG. 9 is displayed on the display screen of the display device 3.

On the fifth question window 90, similarly, a fifth question 91 is displayed under a character string of "Image is being analyzed. Please, answer the next question."

The fifth question 91 is a question of "Please, select images to be used in an album." Thumbnail images IM of images stored in a storage location designated by a user are displayed under the fifth question 91. The thumbnail images IM are displayed at areas corresponding to page numbers of the album as candidates of images to be used (which are classified on the basis of the result of the already performed image analysis). For example, thumbnail images IM that are candidates to be used for a first page and a second page of the album are displayed at a first thumbnail image display area 92, and thumbnail images IM that are candidates to be used for a third page and a fourth page of the album are displayed at a second thumbnail image display area 93. By operating the up button 85, the down button 86, or the knob 87 formed on the right edge of the fifth question window 90, thumbnail images that are not displayed on the fifth question window 90 are displayed in a thumbnail image display area of a corresponding page to appear in the fifth question window 90.

The user selects thumbnail images IM corresponding to images to be used for each page using the mouse 9. Then, asterisks 94 of the selected thumbnail images IM are displayed. The user's preference can be understood from the thumbnail images IM selected by the user, and an output format of the album is determined. For example, in a case where pretty thumbnail images IM are selected, a pretty album is created. Further, on the basis of the selected thumbnail images IM, images to be used in the album are also determined by the CPU 2 (second image selection device). For example, in a case where the thumbnail images IM selected by the user are pretty images, images to be used in the album are also set to pretty images. Whether or not a certain image is a pretty image may be determined using a feature value of the image. An image of which a feature value is within a certain range may be considered as a pretty image. For example, in a case where an image of which each feature value such as brightness, contrast, saturation, or hue is within a certain range generally has a pretty impression, the image may be considered as a pretty image (for example, see JP 6027581B).

In FIG. 9, the thumbnail images IM are divided for each page, but the thumbnail images do not need to be divided for each page. The thumbnail images IM may be displayed irrespective of pages, and may be selected by a user.

Further, thumbnail images of images recommended as images to be used in an album on the basis of thumbnail images selected by a user may be notified to the user. For example, asterisks may be given to the thumbnail images IM selected by the user, and the thumbnail images IM of the images recommended to the user on the basis of the thumbnail images IM selected by the user may be surrounded using a frame 95.

In a case where the image analysis is terminated (YES in step S25 in FIG. 2), an output format of the album is determined by the CPU 2 (output format determination device) from the analysis result and an answer of the user for the question (step S26 in FIG. 3).

The determined output format also includes the number of images to be used in the album determined on the basis of the analysis result and an answer of the user for the first question 51 on the first question window 50 shown in FIG. 5. Since the number of images is relatively determined from a relationship with the number of pages of the album, for example, in a case where an average number of images with respect to the number of pages, that is, an average number of images per page is 3.5, a number obtained by multiplying a total number of pages of the album by the average number of the images is considered as an average number of images used in the album. Such a number of images is relatively small or large compared with the number based on the answer for the first question 51. Further, for example, the type of a template of the album, and images to be used in the album are determined as an example of an output format, from the user's personality understood from the user's answer for the second question 61 shown in FIG. 6, the third question 71 shown in FIG. 7, or the like. In addition, with reference to a preferred layout obtained from the user's answer for the fourth question 81 on the fourth question window 80 shown in FIG. 8, a layout of the album is determined as an output format, and images to be used in the album are determined as an example of an output format from images to be used, obtained from the user's answer for the fifth question 91 on the fifth question window 90 shown in FIG. 9.

The album created in the output format determined on the basis of the analysis result and the user's answers is preview-displayed on the display screen of the display device 3 under the control of the CPU 2 (output control device) (step S27 in FIG. 3). At least a part of the plurality of images read from the storage location is output through the preview display.

Figure 10:
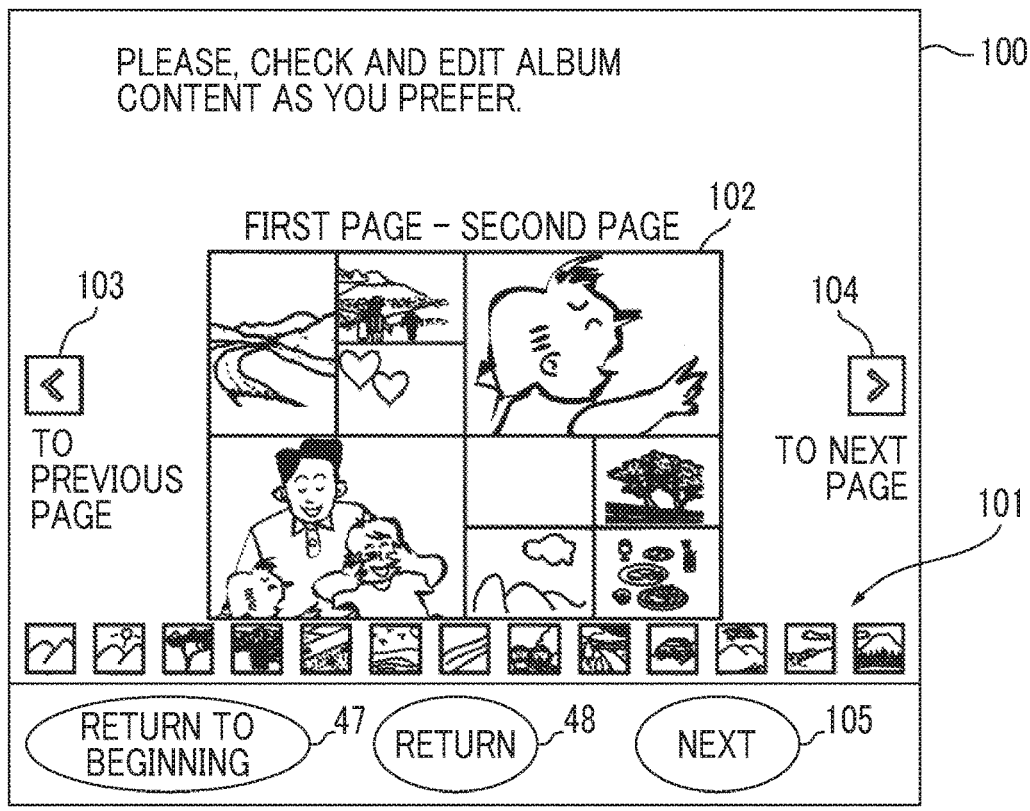
FIG. 10 is a diagram showing an example of a preview display window.

FIG. 10 is a diagram showing an example of a preview display window 100.

On the preview display window 100, a preview display area 102 of an album is formed. Laid-out images of a page of the album are displayed at the preview display area 102. A left button 103 is formed on a left side of the preview display area 102, and a right button 104 is formed on a right side thereof. In a case where the left button 103 is pressed, images of a previous page with reference to the images of the page displayed on the preview display area 102 are displayed at the preview display area 102, and in a case where the right button 104 is pressed, images of a next page with reference to the images of the page displayed at the preview display area 102 are displayed at the preview display area 102.

Under the preview display area 102, an image display area 101 where images that are not used in the album among the plurality of read images are displayed is formed. A next button 105 in which a character string of "next" is displayed is formed on a lower right side of the preview display window 100.

In a case where a user wants to exchange an image displayed at the preview display area 102 for an image displayed at the image display area 101, the user drags and drops an image to be used among the images displayed at the image display area 101 on an image that is an exchange target among the images displayed at the preview display area 102. Then, the images are exchanged. The user may perform layout change or the like, as well as the image exchange.

In a case where the album is changed by the user (YES in step S28 in FIG. 3), content after the change is preview-displayed (step S27 in FIG. 3). In a case where the user presses the next button 105, it is considered as an expression of an order intention (YES in step S29 in FIG. 3), and an order confirm window 110 shown in FIG. 11 is displayed on the display screen of the display device 3.

Figure 11:
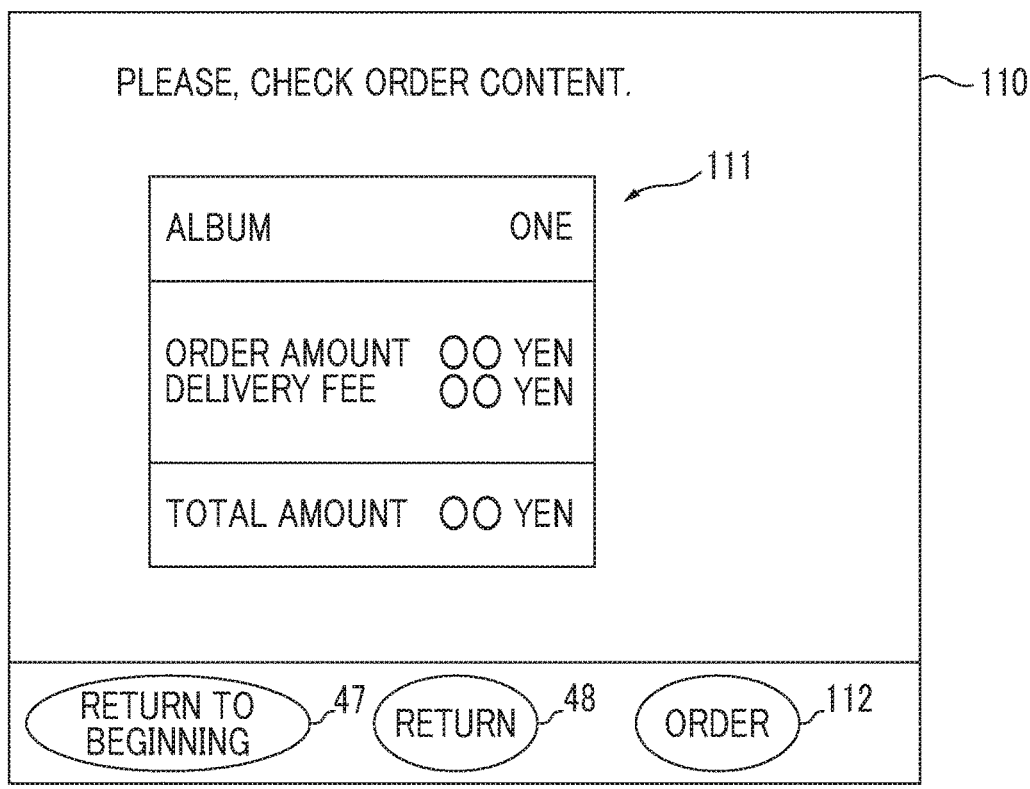
FIG. 11 is a diagram showing an example of an order confirm window.

An order content confirm table 111 is displayed on the order confirm window 110 shown in FIG. 11, and an order button 112 in which a character string of "order" is displayed is formed in a lower right portion of the order confirm window 110.

The user confirms display content of the order content confirm table 111, and presses the order button 112 in a case where there is an order intention. In order to change the order content, the return-to-beginning button 47 or the return button 48 is pressed.

In a case where the order button 112 is pressed (YES in step S29 in FIG. 3), data indicating an order command and an output format is transmitted to an order server (step S30 in FIG. 3). The data indicating the output format includes data on characteristics of images used in an album, layout data indicating layouts, template data for identifying templates, or the like, for example.

Table 1 is a table showing an example of a layout information table obtained from a part of data indicating an output format.

TABLE 1

| Image ID | Feature value | Selection | Page | Position | Size |
|---|---|---|---|---|---|
| 1 | — | Y | 1 | 0, 0 | 60 × 40 |
| 2 | — | N | — | — | — |
| 3 | — | Y | 1 | 100, 100 | 20 × 30 |
| 4 | — | N | — | — | — |
| ⋮ | ⋮ | ⋮ | ⋮ | ⋮ | ⋮ |
| 100 | — | N | — | — | — |

The layout information table includes a feature value of an image corresponding to an image ID of an image read from a storage location, data indicating whether the image is used in an album (Y represents a case where the image is used, and N represents a case where the image is not used), data on a page used in the album, a position of the used image, a size of the image, and the like. The feature value may include a resolution, the amount of data, the degree of out-of-focus, a type of a main subject, a relative size to an image of the main subject, a position of the main subject, a color, or the like of the image. Further, the feature value may include feature values generated by combining the plurality of feature values mentioned above. In addition, the feature value may be configured of a plurality of parameters output from an image input received in a learned model obtained by performing learning from teachers or learning without teachers in advance. Here, there is a case where it is not possible for humans to interpret a meaning of a feature value output from the learned model, but at least a case where the feature value represents a numerical value group that is uniquely output in a case where one image is input, it may be used as the feature value according to this embodiment of the invention. The feature value is information necessary for determining suitability as images (images extracted from a plurality of images) to be used in an album or arrangement positions in the album, or the like.

Table 2 is a table showing an example of a template information table obtained from a part of data indicating output format.

TABLE 2

| Page | Template ID |
|---|---|
| 1 | 3 |
| 2 | 7 |
| 3 | 5 |
| ⋮ | ⋮ |
| 16 | 20 |

The template information table stores template IDs used for each page of an album.

It is possible to understand a layout, a template, images, or the like that are highly likely to be used in an album from the layout information table shown in Table 1, the template information table shown in Table 2, and the like, and thus, it is possible to update the operation program of the image processing apparatus 1 in accordance with a user's preference.

Further, by transmitting the data indicating the order command and the output format together with a user ID to the order server, it is possible to understand a user's preference specified by the user ID. In a case where the same user may make an order next time, first, the user ID may be transmitted to the order server, and then, the layout information table, the template information table, and the like of the user (image editing information) may be transmitted to the image processing apparatus 1 of the user specified by the user ID from the order server, and an output format such as images to be used in an album and a layout may be determined using the tables. Further, data indicating the output format may be stored in the memory 7 of the image processing apparatus 1 without being transmitted to the order server, and in a case where a user uses the image processing apparatus 1, the output format may be determined using data indicating a previous output format, in addition to an image analysis result and user's answers to the questions, and may be output.

Figure 12:
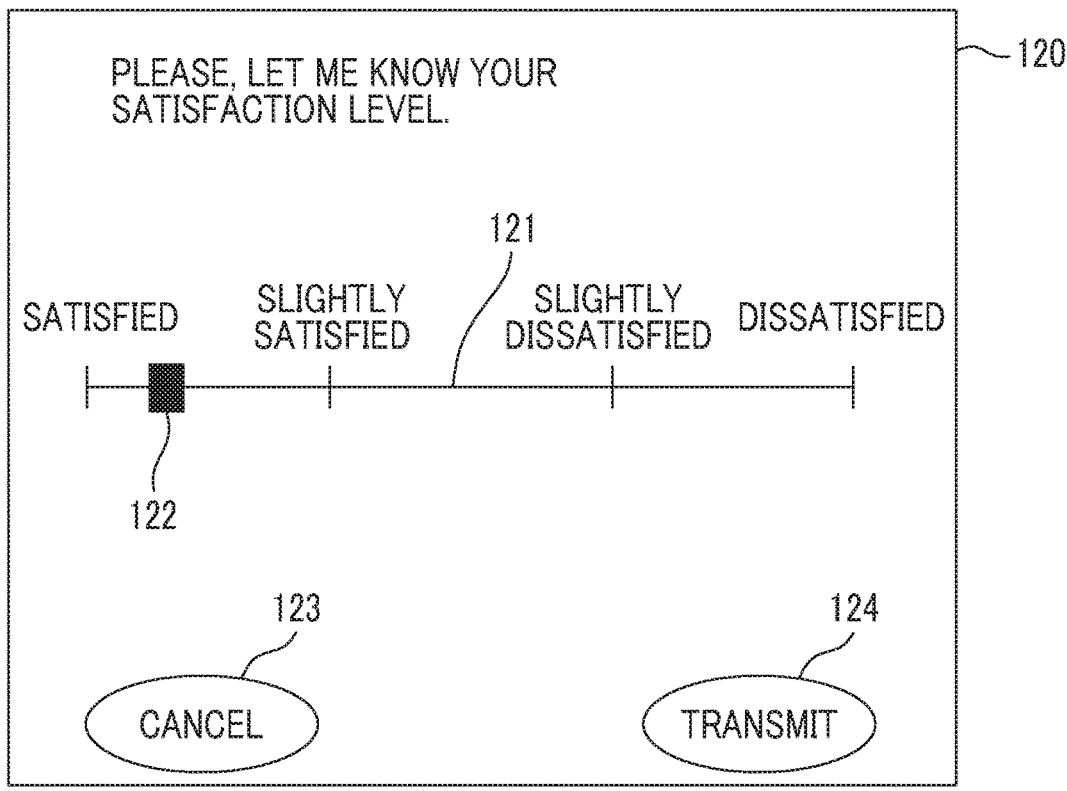
FIG. 12 is a diagram showing an example of a satisfaction level input window.

Subsequently, a satisfaction level input window 120 shown in FIG. 12 is displayed on the display screen of the display device 3.

On the satisfaction level input window 120, a slide bar 121 that extends in a lateral direction is formed, and a slider 122 positioned at a certain position on the slide bar 121 is formed. In the slide bar 121, character strings of "satisfied", "slightly satisfied", "slightly dissatisfied", and "dissatisfied" are displayed. In a lower left portion of the satisfaction level input window 120, a cancel button 123 in which a character string of "cancel" is displayed is formed, and in a lower right portion of the satisfaction level input window 120, a transmit button 124 in which a character string of "transmit" is displayed is formed.

In a case where a user transmits data indicating a satisfaction level to the order server, the user positions the slider 122 (satisfaction level input device) at a position depending on the degree of satisfaction using the mouse 9 to input the satisfaction level (step S31 in FIG. 3). In a case where the transmit button 124 is pressed, data indicating a satisfaction level depending on the position of the slider 122 is transmitted to the order server through the communication device 4 (satisfaction level transmission device) (step S32 in FIG. 3). In a case where the data indicating the satisfaction level is not transmitted to the order server, the cancel button is pressed. The data indicating the satisfaction level is not transmitted to the order server.

According to the first embodiment, it is possible to obtain an album in which a user's preference is reflected.

Second Embodiment

Figure 13:
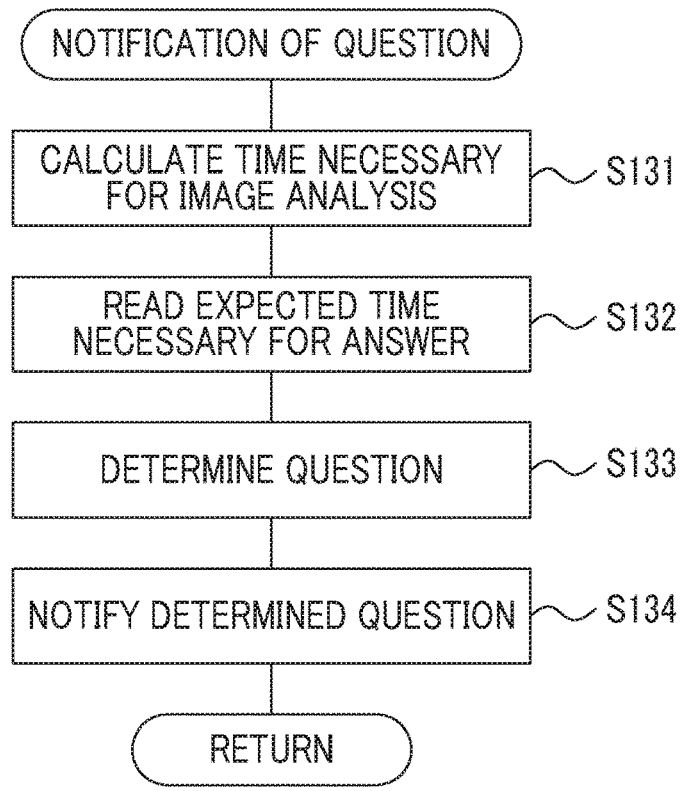
FIG. 13 is a flowchart showing a question notification processing procedure.

FIG. 13 is a flowchart showing a question notification processing procedure (processing procedure of step S23 in FIG. 2).

A time necessary for analyzing a plurality of images read from the storage location is calculated by the CPU 2 (step S131). As described above, an expected time necessary from a time when a question is notified to a time when an answer for the question is received is stored in the memory 7 in advance for each question, and the expected time is read by the CPU 2 (step S132).

A question for which an answer is possible within the time necessary for analyzing the plurality of image is determined from a plurality of questions by the CPU 2 (step S133). The number of the determined questions may be one or plural. The determined questions are notified as shown in FIG. 5 to FIG. 9 (step S134).

In a case where the image analysis is not terminated even though the answers to the questions are terminated, a user should wait until the image analysis is terminated, and in a case where the questions are continued even though the image analysis is terminated, it takes time longer than necessary until an album is created. However, according to this embodiment, it is possible to relatively quickly create an album suitable for a user's preference without making a user wait longer than necessary.

Figure 14:
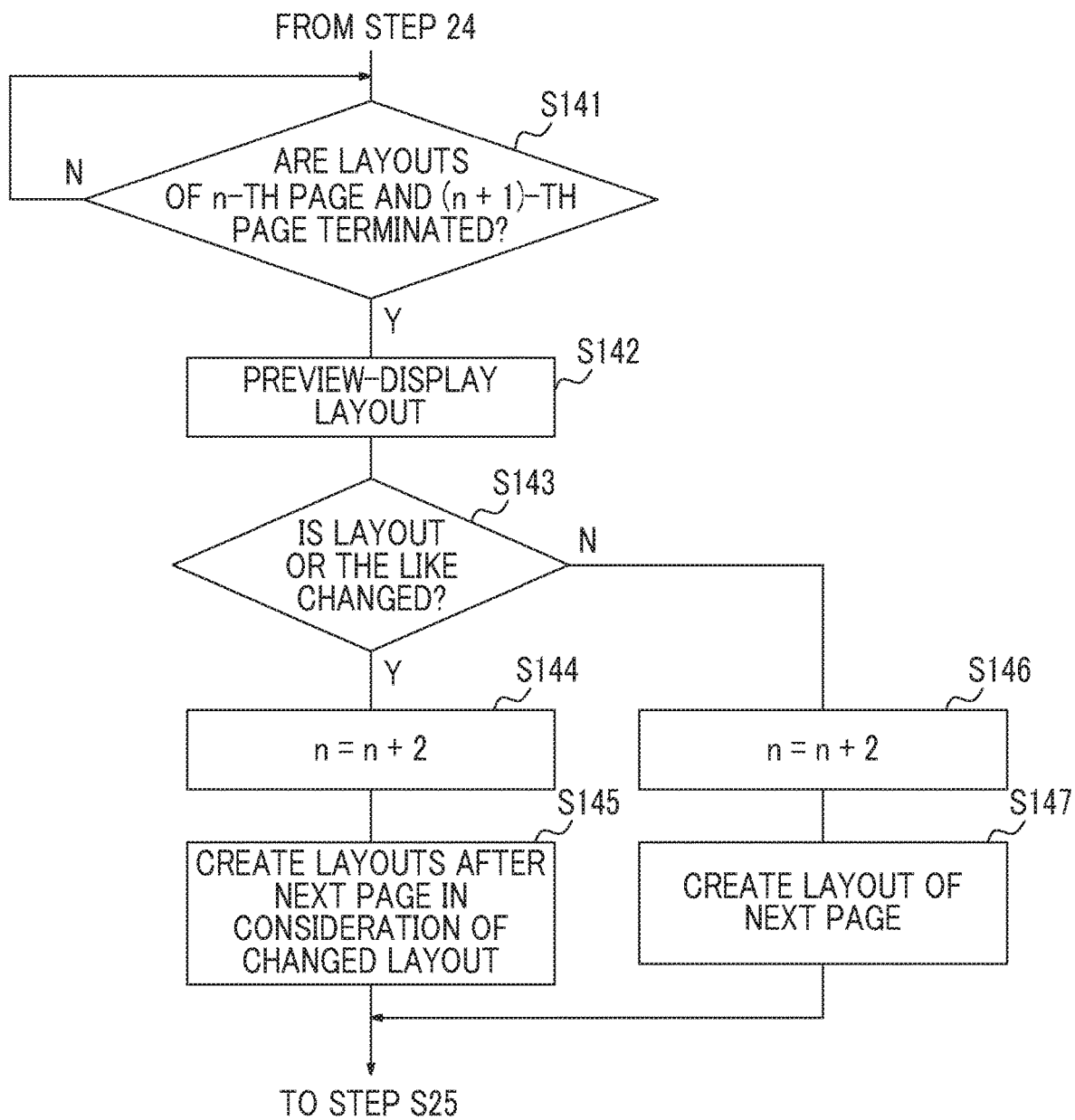
FIG. 14 is a flowchart showing a part of a processing procedure of the image processing apparatus.

FIG. 14 is a flowchart showing a part of the processing procedure of the image processing apparatus 1 shown in FIG. 2.

After the notification of the question (step S23 in FIG. 2) and the answer for the question (step S24 in FIG. 2), the procedure proceeds to a process of step S141 in FIG. 14.

As described above, when the user answers the question, layouts are sequentially determined for each page of an album on the basis of a result of the image analysis performed during the time and an answer result to the question. In a case where layouts of an n-th (n is a natural number, of which an initial value is 1) page and an (n+1)-th page are terminated (step S141), the layouts of the terminated pages are preview-displayed on the display screen of the display device 3 (step S142).

Figure 15:
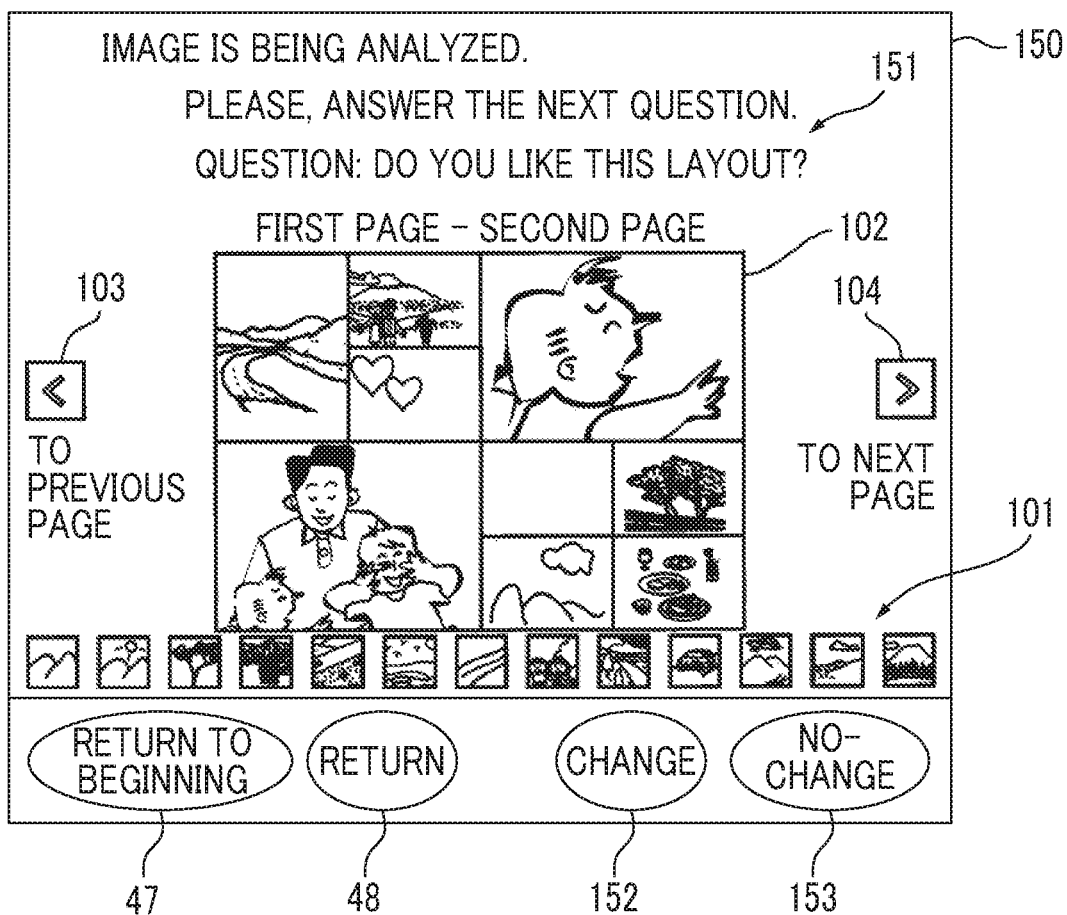
FIG. 15 is a diagram showing an example of a preview display window.

FIG. 15 is a diagram showing an example of a preview display window 150 displayed on the display screen of the display device 3.

On the preview display window 150, the same reference numerals are given to the same portions in the preview display window 100, and description thereof will not be repeated.

At the preview display area 102, layouts of an n-th page and an (n+1)-th page for which the layouts are terminated (one image created using a part of a plurality of images, one page of an album formed of a plurality of pages) are displayed (notified) in a state of being editable by a user. On the preview display window 150, a question 151 of "Do you like a layout below?" is displayed. Further, in a lower right portion of the preview display window 150, a change button 152 in which a character string of "change" is displayed, and a no-change button 153 in which a character string of "no-change" is displayed, are formed.

A user views a layout displayed at the preview display area 102, and then, in a case where it is necessary to change the layout, the user presses the change button 152 (answer reception device), and in a case where it is not necessary to change the layout, the user presses the no-change button 153 (answer reception device).

In a case where the change button 152 is pressed and the layout is changed using the mouse 9 (answer reception device) (YES in step S143), the variable n is incremented by 2 (step S144), and layouts after the next page are created in consideration of the changed layout (step S145). In a case where the no-change button 153 is pressed and the layout is not changed (NO in step S143), the variable n is incremented by 2 (step S146), and a layout of the next page is created (step S147).

In this way, in the second embodiment, an album is completed while asking the user whether content of a layout is satisfactory every time the layout is possible to change the layout on occasion. Accordingly, a layout (one kind of output format according to this embodiment of the invention) is determined on the basis of an image analysis result and a received editing, and the layout that is displayed on occasion becomes closer to a user's preference.

In the above-described embodiments, a case where an album is created has been described, but the invention is not limited to the album, and may be applied to other image merchandise, for example, a post card, a shuffle print, or the like, made of one or more images. In image merchandise such as a plurality of postcards or a plurality of shuffle prints, similarly, a layout of one postcard, shuffle print, or the like may be preview-displayed to a user in a state of being editable on the basis of an image analysis result and an answer to a question from the user at a point of time when the layout is terminated, editing may be performed on the basis of an editing command from the user, and a layout of the next postcard, shuffle print, or the like for which the layout is not terminated may be performed on the basis of an editing result.

Further, in accordance with a result of image analysis of a part of the plurality of images that has already been performed, content of a question to a user may be changed. For example, as long as a user's personality can be understood from image analysis that has already been performed, a question for understanding the user's personality may be omitted.

The above-described image processing apparatus 1 may be configured as a dedicated apparatus, or may be configured using a personal computer, a tablet terminal, or a smartphone.

Further, in the above-described embodiments, the above-described processes are performed in the image processing apparatus 1, but instead, the above-mentioned processes may be performed in an order server capable of communicating with the image processing apparatus 1.

A processing unit that executes the above-described processes may include the CPU 2 that functions as a variety of processing units by executing software, a programmable logic device capable of changing a circuit configuration after manufacturing, such as a field-programmable gate array (FPGA), a dedicated electric circuit that is a processor having a circuit configuration that is dedicatedly designed for executing a specific process, such as an application specific integrated circuit (ASIC), or the like.

One processing unit may be configured of one among the variety of processors, or may be configured of a combination of two or more same or different processors (for example, a combination of a plurality of FPGAs, or a combination of CPU and FPGA). As an example in which a plurality of processing units form one processor, first, a configuration in which a combination of one or more CPUs and software form one processor so that the processor functions as a plurality of processing units, as represented as a computer such as a client computer or a server, may be used. Second, a configuration in which a processor formed by realizing entire functions of a system including a plurality of processing units by one integrated circuit (IC) chip, as represented as a system-on-chip, may be used. As described above, the variety of processing units may be configured by using one or more various processors as a hardware structure.

Further, more specifically, the hardware structure of the various processors is an electric circuit in which circuit elements such as semiconductor elements are combined.

What is claimed is:

1. An image processing apparatus comprising:
    an image analysis device that analyzes, based on at least one of a degree of out-of-focus, a position of a main subject, or a relative size of the main subject with respect to an entirety of an image, a plurality of images to determine whether the images are suitable to be used an album for which the images are used;
    a question notification device that notifies a question about a user's preference of the album during the image analysis of the at least one of the degree of out-of-focus, the position of the main subject, or the relative size of the main subject with respect to the entirety of the image in the image analysis device;

an answer reception device that receives an answer to the question notified by the question notification device; and an output format determination device that determines a structure of the album on the basis of an image analysis result in the image analysis device and the answer received in the answer reception device.

2. The image processing apparatus according to claim 1, further comprising:

an output control device that controls an output device so that at least a part of the plurality of images is output in accordance with the structure of the album determined in the output format determination device.

3. The image processing apparatus according to claim 1, wherein the question notification device notifies a question about the user's preference of the structure of the album.

4. The image processing apparatus according to claim 1, wherein the question notification device notifies a question about the user's preference excluding the structure of the album.

5. The image processing apparatus according to claim 1, wherein the question notification device notifies the question by displaying a plurality of sample images of the plurality of images, and the answer reception device receives sample image selection from the plurality of displayed sample images.

6. The image processing apparatus according to claim 5, wherein the plurality of sample images are determined on the basis of the result of the image analysis already performed in the image analysis device.

7. The image processing apparatus according to claim 5, further comprising:

a first image selection device that selects an image from the plurality of images on the basis of the sample images received in the answer reception device.

8. The image processing apparatus according to claim 1, wherein the question notification device notifies the question by displaying the plurality of images, and the answer reception device receives image selection from the plurality of displayed images.

9. The image processing apparatus according to claim 8, further comprising:

a second image selection device that selects an image from the plurality of images on the basis of the image selection received in the answer reception device.

10. The image processing apparatus according to claim 1, wherein an expected time necessary from a time when the question is notified in the question notification device to a time when the answer is received in the answer reception device is set in advance for each question, and the question notification device determines the question to be notified on the basis of a time necessary for the image analysis in the image analysis device and the expected time.

11. The image processing apparatus according to claim 1, wherein the image analysis device creates one image using a part of the plurality of images, the question notification device notifies the user of the one image in a state where the one image is editable as the question, the answer reception device receives editing of the one image as the answer, and the output format determination device determines the structure of the album on the basis of the image analysis result in the image analysis device and the editing received in the answer reception device.

12. The image processing apparatus according to claim 11, wherein the one image is one page of an album configured of a plurality of pages, the question notification device notifies the user of the one page in a state where the one page is editable as the question, and the answer reception device receives editing of the one page as the answer.

13. The image processing apparatus according to claim 11, wherein the one image is one piece of image merchandise among a plurality of pieces of image merchandise, the question notification device notifies the user of the one piece of image merchandise in a state where the one piece of image merchandise is editable as the question, and the answer reception device receives editing of the one piece of image merchandise as the answer.

14. The image processing apparatus according to claim 2, wherein the output control device controls the output device so that at least the part of the plurality of images is output in accordance with the structure of the album determined on the basis of the image analysis result in the image analysis device, the answer received in the answer reception device, and information on user's previous image editing.

15. The image processing apparatus according to claim 2, further comprising:

a user satisfaction level input device that inputs a user satisfaction level for an image output from the output device under the control of the output control device; and a user satisfaction level transmission device that transmits data indicating the user satisfaction level input in the user satisfaction level input device to a server.

16. An image processing method comprising:

analyzing, based on at least one of a degree of out-of-focus, a position of a main subject, or a relative size of the main subject with respect to an entirety of an image, a plurality of images, using an image analysis device, to determine whether the images are suitable to be used in an album for which the images are used;

notifying a question about a user's preference of the album during the image analysis of the at least one of the degree of out-of-focus, the position of the main subject, or the relative size of the main subject with respect to the entirety of the image in the image analysis device, using a question notification device;

receiving an answer to the question notified by the question notification device, using an answer reception device; and determining a structure of the album on the basis of an image analysis result in the image analysis device and the answer received in the answer reception device, using an output format determination device.

17. Non-transitory recording medium storing a computer-readable program for controlling a computer of an image processing apparatus, the program causing the computer to execute:

analyzing, based on at least one of a degree of out-of-focus, a position of a main subject, or a relative size of the main subject with respect to an entirety of an image, a plurality of images to determine whether the images are suitable to be used in an album for which the images are used;

notifying a question about a user's preference of the album during the image analysis of the at least one of the degree of out-of-focus, the position of the main subject, or the relative size of the main subject with respect to the entirety of the image;

receiving an answer to the notified question; and determining a structure of the album on the basis of an image analysis result and the received answer.

18. The image processing apparatus according to claim 1, wherein the question notification device notifies at least one question based on one or more of, a number of images to be used in an output of at least a part of the plurality of images, activity content of the user, a personality of the user, a preference of the user for an image of the plurality of images, a preference of the user for a layout among a plurality of layouts of the at least a part of the plurality of images, or an image to be used in the output.

* * * * *